United States Patent
Tang

(10) Patent No.: US 11,317,450 B2
(45) Date of Patent: Apr. 26, 2022

(54) WIRELESS COMMUNICATION METHOD AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 122 days.

(21) Appl. No.: 16/465,836

(22) PCT Filed: Feb. 9, 2018

(86) PCT No.: PCT/CN2018/076042
§ 371 (c)(1),
(2) Date: May 31, 2019

(87) PCT Pub. No.: WO2019/153265
PCT Pub. Date: Aug. 15, 2019

(65) Prior Publication Data
US 2021/0029759 A1   Jan. 28, 2021

(51) Int. Cl.
*H04W 76/11* (2018.01)
*H04W 76/12* (2018.01)
(Continued)

(52) U.S. Cl.
CPC ......... *H04W 76/12* (2018.02); *H04W 60/005* (2013.01); *H04W 68/12* (2013.01); *H04W 76/11* (2018.02); *H04W 88/06* (2013.01)

(58) Field of Classification Search
None
See application file for complete search history.

(56) References Cited

U.S. PATENT DOCUMENTS

| 7,668,159 B2 | 2/2010 | Buckley |
| 9,167,506 B2 | 10/2015 | Faccin |

(Continued)

FOREIGN PATENT DOCUMENTS

| CN | 101388828 A | 3/2009 |
| CN | 102792739 A | 11/2012 |

(Continued)

OTHER PUBLICATIONS

International Search Report in international application No. PCT/CN2018/076042, dated Nov. 15, 2018.

(Continued)

*Primary Examiner* — Ivan O Latorre
*Assistant Examiner* — Emmanuel K Maglo

(57) ABSTRACT

The embodiments of the disclosure provide a method for wireless communication and a network device, which may determine an access domain for called terminal device when the called terminal device is dual registered terminal device, thereby ensuring establishment of a call. In the method, a first terminal device has registered with both a first network and a second network. The method includes that: a network device acquires first information for the first terminal device, here, the first information is indicative of information used for the first terminal device to establish at least one of a Packet Data Unit (PDU) session or a Packet Data Network (PDN) connection in at least one of the first network or the second network; and responsive to that the first terminal device is called by a second terminal device, the network device determines, according to an identifier of the first terminal device and the first information, an access domain used by the first terminal device for establishment of a call connection between the first terminal device and the second terminal device.

8 Claims, 6 Drawing Sheets

(51) Int. Cl.
*H04W 60/00* (2009.01)
*H04W 68/12* (2009.01)
*H04W 88/06* (2009.01)

(56) References Cited

U.S. PATENT DOCUMENTS

| | | | |
|---|---|---|---|
| 9,398,517 | B2 | 7/2016 | Faccin |
| 2008/0267171 | A1 | 10/2008 | Buckley |
| 2011/0170517 | A1 | 7/2011 | Bakker |
| 2011/0171953 | A1 | 7/2011 | Faccin |
| 2012/0184266 | A1 | 7/2012 | Faccin |
| 2012/0307732 | A1 | 12/2012 | Olsson |
| 2018/0020418 | A1 | 1/2018 | Chandramouli et al. |
| 2018/0324740 | A1* | 11/2018 | Edge ............... H04W 12/0431 |
| 2019/0053105 | A1* | 2/2019 | Park ................ H04W 36/023 |
| 2019/0124561 | A1* | 4/2019 | Faccin .............. H04W 8/02 |
| 2019/0166517 | A1* | 5/2019 | Niemi ............... H04W 60/005 |
| 2019/0191467 | A1* | 6/2019 | Dao ................. H04W 76/10 |
| 2019/0306744 | A1* | 10/2019 | Huang-Fu .......... H04W 76/22 |
| 2019/0357037 | A1* | 11/2019 | Velev ............... H04W 8/04 |
| 2020/0015128 | A1* | 1/2020 | Stojanovski ...... H04W 36/0022 |
| 2020/0100303 | A1* | 3/2020 | Sankar ............. H04W 76/12 |
| 2020/0280836 | A1* | 9/2020 | Velev .............. H04W 8/12 |
| 2020/0314729 | A1* | 10/2020 | Kwok .............. H04W 24/02 |
| 2020/0337101 | A1* | 10/2020 | Brooks ............ H04W 24/02 |

FOREIGN PATENT DOCUMENTS

| | | |
|---|---|---|
| CN | 103731814 A | 4/2014 |
| CN | 104429124 A | 3/2015 |
| CN | 105681158 A | 6/2016 |
| CN | 104113536 B | 8/2017 |
| CN | 107509184 A | 12/2017 |
| CN | 107645723 A | 1/2018 |
| EP | 2367335 B1 | 12/2012 |
| WO | 2016165758 A1 | 10/2016 |

OTHER PUBLICATIONS

Written Opinion of the International Search Authority in international application No. PCT/CN2018/076042, dated Nov. 15, 2018.
Second Office Action of the Chinese application No. 201880004303.7, dated Mar. 16, 2020.
Volte Access Domain and Service Domain Delection, http://www.docin.com/p-1283490006.html; Wang Zhisong et al, "Business Domain Deployment Scheme in Volte", Mobile Communication, vol. 3-4, 2014.
NTT DOCOMO:"T-ADS with dual registered UE", 3GPP DRAFT; S2-180747 Modification of T-ADS With DR-R2, 3rd Generation Partnership Project(3GPP),vol. SA WG2, No. Gothenburg Sweden; Jan. 22, 2018-Jan. 26, 2018 Jan. 16, 2018(Jan. 16, 2018),XP051390154, the whole document.
SA2:"[Draft] LS OUT on IMS registration for Dual-Registered UE", 3GPP DRAFT;S2-181219 WAS S2-180873-LS OUT to CT1 on IMS Registration for Dual-Registered UE, 3rd Generation Partnership Project (3GPP), vol. SA WG2, No. Gothenburg, Sweden; Jan. 22, 2018-Jan. 26, 2018 Jan. 26, 2018(Jan. 26, 2018), XP051390326, the whole document.
"3rd Generation Partnership Project; Technical Specification Group Services and System Aspects;System Architecture for the 5G System; Stage 2(Release 15)", 3GPP Standard; Technical Specification; 3GPP TS 23.501, 3rd Generation Partnership Project (3GPP), vol. SA WG2, No. V15.0.0, Dec. 22, 2017 (Dec. 22, 2017), pp. 1-181,XP051392101, section 5.16.3.
Zhongke Li et al., "Method on VoLTE Services Development with HLR/EPC HSS and IMS HSS Separated Deployment"; Mobile Communication; Dec. 30, 2013.
Rachad Maallawi;Nazim Agouimine;Benoit Radier;et al. "A Comprehensive Survey on Offload Techniques and Management in Wireless Access and Core Networks"; IEEE Communication Surveys & Tutorials, Nov. 26, 2014.
International Search Report in the international application No. PCT/CN2018/076042, dated Nov. 15, 2018.
Supplementary European Search Report in the European application No. 18882287.8, dated Jan. 13, 2020.
First Office Action of the Chinese application No. 201880004303.7, dated Dec. 3, 2019.
Huawei et al: "TS 23.501: Description of DNN", 3GPP DRAFT; S2-171064—Definition of DNN, 3rd Generation Partnership Project (3GPP), Mobile Competence Centre; 650, Route Des Lucioles; F-06921 Sophia-Antipolis Cedex; France, vol. SA WG2, No. Dubrovnik, Croatia; Feb. 13, 2017-Feb. 17, 2017 Feb. 13, 2017 (Feb. 13, 2017), XP051217182, Retrieved from the Internet: URL: http://www.3gpp.org/ftp/Meetings_3GPP_SYNC/SA2/Docs/ [ retrieved on Feb. 13, 2017].
Nokia et al: "23.501 5.9.3: DNN versus APN", 3GPP DRAFT; S2-170888-23.501 APN-DNN, 3rd Generation Partnership Project (3GPP), Mobile Competence Centre; 650, Route Des Lucioles; F-06921 Sophia-Antipolis Cedex; France, vol. SA WG2, No. Dubrovnik, Croatia; Feb. 13, 2017-Feb. 17, 2017 Feb. 13, 2017 (Feb. 13, 2017), XP051217009, Retrieved from the Internet: URL: http://www.3gpp.org/ftp/Meetings_3GPP_SYNC/SA2/Docs/ [retrieved on Feb. 13, 2017].
First Office Action of the European application No. 18882287.8, dated Oct. 19, 2020.

\* cited by examiner

200 | The network device acquires first information for the first terminal device, here, the first information is indicative of information used for the first terminal device to establish at least one of a PDU session or a PDN connection in at least one of the first network or the second network ~ S210

Responsive to that the first terminal device is called by the second terminal device, the network device determines, according to an identifier of the first terminal device and the first information, an access domain used by the first terminal device for establishment of a call connection between the first terminal device and the second terminal device ~ S220

FIG. 2

300 | The network device acquires first information for the first terminal device, here, the first information is indicative of information used for the first terminal device to establish at least one of a PDU session or a PDN connection in at least one of a first network or a second network ~ S310

The network device sends the first information to a UDM+HSS network element such that the UDM+HSS network element determines, according to an identifier of the first terminal device and the first information, an access domain used by the first UE for establishment of a call connection Between the first terminal device and a second terminal device ~ S320

FIG. 3

WIRELESS COMMUNICATION METHOD AND NETWORK DEVICE

TECHNICAL FIELD

The disclosure relates to the field of communications, and more particularly to a method for wireless communication and a network device.

BACKGROUND

At present, in a calling process, a calling terminal device (for example, User Equipment (UE)) may usually query an access domain (core network) where a called terminal device is located on a Unified Data Management (UDM)+ Home Subscriber Server (HSS) network element to find a network element (for example, an Access and Mobility Function (AMF)/Mobility Management Entity (MME)) serving the called terminal device, and then the network element triggers a paging or triggering request to enable the called terminal device to return to a connected state to implement establishment of a call. However, if the called terminal device is dual registered terminal device, for example, the called terminal device has registered with both 5-Generation New Radio (5G NR) and Long Term Evolution (LTE) and both of a 5G Core (5GC) and an Evolved Packet Core (EPC) may support a Voice Over Internet Protocol Multimedia Subsystem (VoIMS), then it is impossible to determine the specific domain where the called terminal device is located when the network element for the calling terminal device queries the access domain for the called terminal device, thus it is impossible to find a network where the called terminal device is located to complete establishment of the call.

SUMMARY

Embodiments of the disclosure provide a method for wireless communication and a network device, which may determine an access domain for a called terminal device when the called terminal device is a dual registered terminal device, thereby ensuring establishment of a call.

In a first aspect, the embodiments of the disclosure provide a method for wireless communication, where a first terminal device has registered with both a first network and a second network.

The method may include the following operations.

A network device acquires first information for the first terminal device, here, the first information is indicative of information used for the first terminal device to establish at least of a Packet Data Unit (PDU) session or a Packet Data Network (PDN) connection in at least one of the first network or the second network.

Responsive to that the first terminal device is called by a second terminal device, the network device determines, according to an identifier of the first terminal device and the first information, an access domain used by the first terminal device for establishment of a call connection between the first terminal device and the second terminal device.

It is to be understood that the first information is related to the access domain for the first terminal device.

Accordingly, in the method for wireless communication of the embodiments of the disclosure, the network device acquires the first information being indicative of the information used for the first terminal device to create at least one of the PDU session or the PDN connection in at least one of the first network or the second network, and the first information is related to the access domain for the first terminal device. Therefore, responsive to that the first terminal device is called by the second terminal device, the access domain used by the first terminal device for establishment of the call connection the first terminal device and the second terminal device may be determined according to the identifier of the first terminal device and the first information, and the second terminal device may further determine a core network device serving the first terminal device based on the access domain to ensure establishment of a call.

Optionally, in an implementation mode of the first aspect, the first information may include at least one of: an Internet Protocol (IP) address, which is allocated for the first terminal device in a PDU session establishment process, for the PDU session, an IP address, which is allocated for the first terminal device in a PDN connection establishment process, for the PDN connection, a Destination Network Name (DNN) corresponding to the PDU session, or an Access Point Name (APN) corresponding to the PDN connection.

Optionally, in an implementation mode of the first aspect, the network device may be a UDM+HSS network element.

The operation that the network device acquires access domain information for the first terminal device may include the following operations.

In a PDU session establishment process, the UDM+HSS network element receives the first information sent by a Session Management Function (SMF) network element serving the first terminal device, or in a PDN connection establishment process, the UDM+ HSS network element receives the first information sent by a Core Packet Gateway (PGW-C) network element serving the first terminal device.

Optionally, in an implementation mode of the first aspect, the network device may be a UDM+HSS network element.

The operation that the network device acquires access domain information for the first terminal device may include the following operations.

In a PDU session establishment process, the UDM+HSS network element receives the first information sent by an AMF network element serving the first terminal device, here, the first information sent by the AMF network element is acquired from an SMF network element, or in a PDN connection establishment process, the UDM+ HSS network element receives the first information sent by an MME network element serving the first terminal device, here, the first information sent by the MME network element is acquired from a PGW-C network element.

Optionally, in an implementation mode of the first aspect, the network device may be a UDM+HSS network element.

Responsive to that the UDM+HSS network element performs a called query for the first terminal device, the operation that the network device acquires access domain information for the first terminal device may include the following operations.

In a PDU session establishment process, the UDM+HSS network element receives the first information sent by an AMF network element serving the first terminal device, here, the first information sent by the AMF network element is acquired from an SMF network element, or in a PDN connection establishment process, the UDM+ HSS network element receives the first information sent by an MME network element serving the first terminal device, here, the first information sent by the MME network element is acquired from a PGW-C network element.

Optionally, in an implementation mode of the first aspect, the network device may be a UDM+HSS network element.

The operation that the network device acquires access domain information for the first terminal device may include the following operations.

The UDM+HSS network element receives a request message sent by the second terminal device, here, the request message is used to request the UDM+HSS network element to determine the access domain.

The UDM+HSS network element sends query information to an AMF network element or MME network element serving the first terminal device, here, the query information is used to indicate a query for the first information.

The UDM+HSS network element receives the first information sent by the AMF network element or the MME network element, here, the first information sent by the AMF network element is acquired from at least one SMF network element serving the first terminal device and the first information sent by the MME network element is acquired from at least one PGW-C network element serving the first terminal device.

Optionally, in an implementation mode of the first aspect, the method may further include the following operation.

The network device sends the access domain to a core network device serving the second terminal device such that the core network device determines an AMF network element or MME network element serving the first terminal device according to the access domain.

Optionally, in an implementation mode of the first aspect, the first network may be an LTE network and the second network may be an NR network, or the first network may be an NR network and the second network may be an LTE network, or the first network may be an NR network and the second network may be an NR network, or the first network may be an LTE network and the second network may be an LTE network.

In a second aspect, the embodiments of the disclosure provide a method for wireless communication, where a first terminal device has registered with both a first network and a second network.

The method may include the following operations.

A network device acquires first information for the first terminal device, here, the first information is indicative of information used for the first terminal device to establish at least one of a PDU session or a PDN connection in at least one of the first network or the second network.

The network device sends the first information to a UDM+HSS network element such that the UDM+HSS network element determines, according to an identifier of the first terminal device and the first information, an access domain used by the first terminal device for establishment of a call connection between the first terminal device and a second terminal device.

It is to be understood that the first information is related to the access domain for the first terminal device.

Accordingly, in the method for wireless communication of the embodiments of the disclosure, the network device acquires the first information being indicative of the information used for the first terminal device to establish at least one of the PDU session or the PDN connection in at least one of the first network or the second network, and sends the first information to the UDM+HSS network element, and the first information is related to the access domain for the first terminal device. Therefore, when the first terminal device is called by the second terminal device, the UDM+HSS network element may determine, according to the identifier of the first terminal device and the first information, the access domain used by the first terminal device for establishment of the call connection between the first terminal device and the second terminal device, and the second terminal device may further determine a core network device serving the first terminal device based on the access domain to ensure establishment of a call.

Optionally, in an implementation mode of the second aspect, the first information may include at least one of: an IP address, which is allocated for the first terminal device in a PDU session establishment process, for the PDU session, an IP, which is allocated for the first terminal device in a PDN connection establishment process, address for the PDN connection, a DNN corresponding to the PDU session, or an APN corresponding to the PDN connection.

Optionally, in an implementation mode of the second aspect, the network device may be an SMF network element.

The operation that the network device acquires access domain information for the first terminal device may include the following operation.

In a PDU session establishment process, the SMF acquires the first information.

Optionally, in an implementation mode of the second aspect, the network device may be a PGW-C network element.

The operation that the network device acquires access domain information for the first terminal device may include the following operation.

In a PDN connection establishment process, the PGW-C network element acquires the first information.

Optionally, in an implementation mode of the second aspect, the network device may be an AMF network element.

The operation that the network device acquires access domain information for the first terminal device may include the following operation.

In a PDU session establishment process, the AMF network element receives the first information sent by an SMF network element.

Optionally, in an implementation mode of the second aspect, the network device may be an MME network element.

The operation that the network device acquires access domain information for the first terminal device may include the following operation.

In a PDN connection establishment process, the MME network element receives the first information sent by a PGW-C network element.

Optionally, in an implementation mode of the second aspect, the network device may be an AMF network element.

Responsive to that the UDM+HSS network element performs a called query for the first terminal device, the operation that the network device acquires access domain information for the first terminal device may include the following operation.

The AMF network element receives the first information sent by an SMF network element.

Optionally, in an implementation mode of the second aspect, the network device may be an MME network element.

Responsive to that the UDM+HSS network element performs a called query for the first terminal device, the operation that the network device acquires access domain information for the first terminal device may include the following operation.

The MME network element receives the first information sent by a PGW-C network element.

Optionally, in an implementation mode of the second aspect, the network device may be an AMF network element.

The operation that the network device acquires access domain information for the first terminal device may include the following operation.

The AMF network element receives first indication information sent by the UDM+HSS network element, here, the first indication information is used to indicate that the AMF network element queries the first information.

The AMF network element sends second indication information to at least one SMF network element serving the first terminal device, here, the second indication information is used to indicate that the at least one SMF network element queries the first information.

The AMF network element receives the first information fed back by the at least one SMF network element.

Optionally, in an implementation mode of the second aspect, the network device may be an MME network element.

The operation that the network device acquires access domain information for the first terminal device may include the following operation.

The MME network element receives third indication information sent by the UDM+HSS network element, here, the third indication information is used to indicate that the MME network element queries the first information.

The MME network element sends fourth indication information to at least one PGW-C network element serving the first terminal device, here, the fourth indication information is used to indicate that the at least one PGW-C network element queries the first information.

The MME network element receives the first information fed back by the at least one PGW-C network element.

Optionally, in an implementation mode of the second aspect, the network device may be an SMF network element or a PGW-C network element.

The operation that the network device acquires access domain information for the first terminal device may include the following operation.

The SMF network element or the PGW-C network element receives fifth indication information sent by the UDM+HSS network element, here, the fifth indication information is used to indicate a query for the first information.

The SMF network element or the PGW-C network element acquires the first information according to the fifth indication information.

Optionally, in an implementation mode of the second aspect, the first network may be an LTE network and the second network may be an NR network, or the first network may be an NR network and the second network may be an LTE network, or the first network may be an NR network and the second network may be an NR network, or the first network may be an LTE network and the second network may be an LTE network.

In a third aspect, the embodiments of the disclosure provide a network device, which may include modules or units executing the method in the first aspect or any optional implementation mode of the first aspect.

In a fourth aspect, the embodiments of the disclosure provide a network device, which may include modules or units executing the method in the second aspect or any optional implementation mode of the second aspect.

In a fifth aspect, there is provided a network device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the first aspect or any possible implementation mode of the first aspect.

In a sixth aspect, there is provided a network device, which includes a processor, a memory and a communication interface. The processor is connected with the memory and the communication interface. The memory is configured to store an instruction, the processor is configured to execute the instruction, and the communication interface is configured for communication with another network element under control of the processor. When the processor executes the instruction stored in the memory, such execution enables the processor to execute the method in the second aspect or any possible implementation mode of the second aspect.

In a seventh aspect, there is provided a computer storage medium having stored thereon a program code that, when executed by a computer, cause the computer to execute an instruction for the method in each aspect.

In an eighth aspect, there is provided a computer program product including an instruction, which runs on a computer to enable the computer to execute the method in each aspect.

BRIEF DESCRIPTION OF DRAWINGS

FIG. 2 is a schematic flowchart of a method for wireless communication according to an embodiment of the disclosure.

FIG. 3 is a schematic flowchart of another method for wireless communication according to an embodiment of the disclosure.

DETAILED DESCRIPTION

The technical solutions in the embodiments of the disclosure will be clearly and completely described below in combination with the drawings in the embodiments of the disclosure.

The technical solutions of the embodiments of the disclosure may be applied to various communication systems, for example, an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G NR communication system.

In the embodiments of the disclosure, terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, terminal device in a 5G network, terminal device in a future evolved Public Land Mobile Network (PLMN) or the like. There are no limits made in the embodiments of the disclosure.

Each embodiment of the disclosure is described in combination with a network device. The network device in the embodiments of the disclosure may be a device configured to communicate with the terminal device. An access network device may be an Evolutional Node B (eNB or eNode B) in the LTE system, and may also be a radio controller in a Cloud Radio Access Network (CRAN) scenario. Or the access network device may be a relay station, an access point, a vehicle-mounted device, a wearable device, a Next Generation Evolutional Node B (NG-eNB), an access network device (for example, gNB) in the 5G network, an access network device in the future evolved PLMN or the like. There are no limits made in the embodiments of the disclosure.

Figure 1:
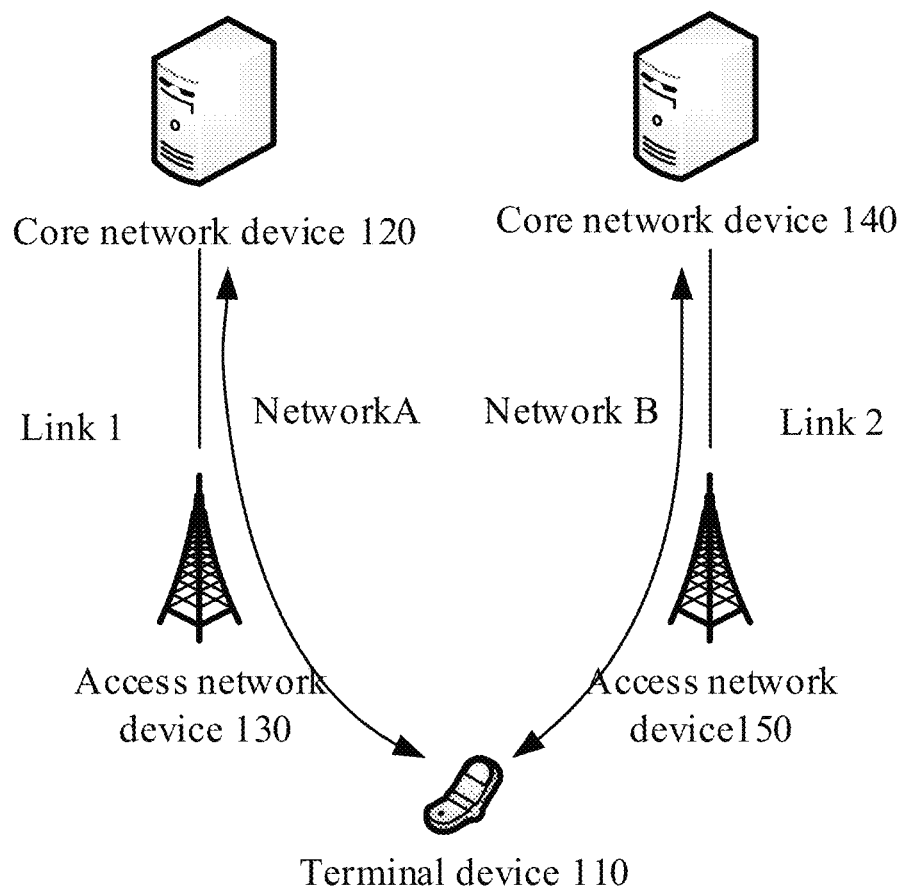
FIG. 1 is a schematic diagram of an application scenario according to an embodiment of the disclosure.

FIG. 1 is a schematic diagram of an application scenario according to an embodiment of the disclosure. Terminal device 110 in a wireless communication system 100 illustrated in FIG. 1 registers with a network A through a link 1 and registers with a network B through a link 2. The terminal device 110 has communication connections with a core network device 120 and an access network device 130 through the link 1, and the terminal device 110 has communication connections with a core network device 140 and an access network device 150 through the link 2. The core network device 120 has a communication connection with the access network device 130, and the core network device 140 has a communication connection with the access network device 150. Both of the core network device 120 and the core network device 140 serve the terminal device 110. There are no limits made thereto in the embodiment of the disclosure.

Optionally, the wireless communication system 100 may further include another network entity such as a Unified Data Management (UDM), an Authentication Server Function (AUSF), a User Plane Function (UPF), a Signaling Gateway (SGW), a Core Packet Gateway (PGW-C), a User Packet Gateway (PGW-U) and a UDM+HSS network element. There are no limits made thereto in the embodiment of the disclosure.

Optionally, the network A is an LTE network and the network B is an NR network, or the network A is an NR network and the network B is an LTE network, or the network A is an NR network and the network B is an NR network, or the network A is an LTE network and the network B is an LTE network.

Optionally, an EPC in the LTE network supports a VoIMS, and a core network device in the LTE network may be an MME or a PGW-C and an access network device may be an eNB. A 5GC in the LTE network may also support the VoIMS, and the core network device in the NR network may be an AMF or an SMF and the access network device may be a gNB.

In addition, each aspect or characteristic of the disclosure may be implemented into a method, a device or a product programed with a standard and/or using an engineering technology. Term "product" used in the disclosure covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD) and a Digital Versatile Disk (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Term "machine-readable medium" may include, but not limited to, various media capable of storing, including and/or bearing instructions and/or data.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the invention usually represents that previous and next associated objects form an "or" relationship.

FIG. 2 is a schematic flowchart of a method 200 for wireless communication according to an embodiment of the disclosure. As illustrated in FIG. 2, the method 200 may be performed by a network device. The network device may be a UDM+HSS network element in a wireless communication system 100 illustrated in FIG. 1. A first terminal device may be a terminal device in the wireless communication system 100 illustrated in FIG. 1. The first terminal device has registered with both a first network and a second network. The method 200 includes the following contents.

In S210, the network device acquires first information for the first terminal device, here, the first information is indicative of information used for the first terminal device to establish at least one of a PDU session or a PDN connection in at least one of the first network or the second network.

It is to be understood that the first information is related to the access domain for the first terminal device.

Optionally, the first network is an LTE network and the second network is an NR network, or the first network is an NR network and the second network is an LTE network, or the first network is an NR network and the second network is an NR network, or the first network is an LTE network and the second network is an LTE network.

Optionally, the first information includes at least one of: an IP address, which is allocated for the first terminal device in a PDU session establishment process, for the PDU session, an IP address, which is allocated for the first terminal device in a PDN connection establishment process, for the PDN connection, a DNN corresponding to the PDU session, or an APN corresponding to the PDN connection.

Optionally, the first terminal device has registered with both the LTE network and the NR network, the LTE network corresponds to an access domain 1 and the NR network corresponds to an access domain 2.

For example, the first information includes an IP address a, which is allocated for the first terminal device in a PDU session establishment process in a LTE network, for the PDU session and an IP address b, which is allocated for the first terminal device in a PDU session establishment process in a NR network, for the PDU session. The IP address a corresponds to the access domain 1 and the IP address b corresponds to the access domain 2. Therefore, if the first information includes the IP address a, the network device may determine the access domain 1, and if the first information includes the IP address b, the network device may determine the access domain 2.

For another example, the first information includes an IP address c, which is allocated for the first terminal device in a PDN connection establishment process in a LTE network, for the PDN connection and an IP address d, which is allocated for the first terminal device in a PDN connection establishment process in a NR network, for the PDN connection. The IP address c corresponds to the access domain 1 and the IP address d corresponds to the access domain 2. Therefore, if the first information includes the IP address c, the network device may determine the access domain 1, and if the first information includes the IP address d, the network device may determine the access domain 2.

For another example, the first information includes a DNN e which is allocated for the first terminal device in a PDU session establishment process in a LTE network and which corresponds to the PDU session and a DNN f which is allocated for the first terminal device in a PDU session establishment process in a NR network and which corresponds to the PDU session. The DNN e corresponds to the access domain 1 and the DNN f corresponds to the access domain 2. Therefore, if the first information includes the DNN e, the network device may determine the access domain 1, and if the first information includes the DNN f, the network device may determine the access domain 2.

For another example, the first information includes an APN g which is allocated for the first terminal device in a PDN connection establishment process in a LTE network and which corresponds to the PDN connection and an APN h which is allocated for the first terminal device in a PDN connection establishment process in a NR network and which corresponds to the PDN connection. The APN g corresponds to the access domain 1 and the APN h corresponds to the access domain 2. Therefore, if the first information includes the APN g, the network device may determine the access domain 1, and if the first information includes the APN h, the network device may determine the access domain 2.

Optionally, the network device may be a UDM and HSS (UDM+HSS) network element.

It is to be understood that at least one of the IP address, which is allocated for the first terminal device in the PDU session establishment process, for the PDU session or the DNN corresponding to the PDU session is stored in at least one SMF network element serving the first terminal device.

It is also to be understood that at least one of the IP address, which is allocated for the first terminal device in the PDN connection establishment process, for the PDN connection or the APN corresponding to the PDN connection is stored in at least one PGW-C network element serving the first terminal device.

Specifically, the UDM+HSS network element may acquire the first information for the first terminal device in the following manners.

A first manner: the UDM+HSS network element directly acquires the first information from an SMF network element or a PGW-C network element.

For example, in a PDU session establishment process, the UDM+HSS network element receives the first information sent by an SMF network element serving the first terminal device.

For another example, in a PDN connection establishment process, the UDM+HSS network element receives the first information sent by a PGW-C network element serving the first terminal device.

A second manner: the UDM+HSS network element acquires the first information from an AMF network element or an MME network element.

For example, in a PDU session establishment process, the UDM+HSS network element receives the first information sent by an AMF network element serving the first terminal device, here, the first information sent by the AMF network element is acquired from an SMF network element. For example, the SMF network element sends the first information to the AMF network element through an update Session Management (SM) context response message in the PDU session establishment process. For example, the SMF sends the first information to the AMF network element through a PDUSession_UpdateSMContext_Response message.

For another example, in a PDN connection establishment process, the UDM+HSS network element receives the first information sent by an MME network element serving the first terminal device, here, the first information sent by the MME network element is acquired from a PGW-C network element. For example, the PGW-C network element sends the first information to the MME network element through a create bearer response message.

A third manner: responsive to that the UDM+HSS network element performs a called query for the first terminal device, the UDM+HSS network element acquires the first information from an AMF network element or an MME network element.

For example, in a PDU session establishment process, the UDM+HSS network element receives the first information sent by an AMF network element serving the first terminal device, here, the first information sent by the AMF network element is acquired from an SMF network element.

For another example, in a PDN connection establishment process, the UDM+HSS network element receives the first information sent by an MME network element serving the first terminal device, here, the first information sent by the MME network element is acquired from a PGW-C network element.

A fourth manner: the UDM+HSS network element acquires the first information from an AMF network element or an MME network element.

For example, the UDM+HSS network element receives a request message sent by a second terminal device, here, the request message is used to request the UDM+HSS network element to determine an access domain.

The UDM+HSS network element sends query information to an AMF network element or MME network element serving the first terminal device, here, the query information is used to indicate a query for the first information.

The UDM+HSS network element receives the first information sent by the AMF network element or the MME network element, here, the first information sent by the AMF network element is acquired from the at least one SMF network element serving the first terminal device and the first information sent by the MME network element is acquired from the at least one PGW-C network element serving the first terminal device.

In S220, responsive to that the first terminal device is called by the second terminal device, the network device determines, according to an identifier of the first terminal device and the first information, an access domain used by the first terminal device for establishment of a call connection between the first terminal device and the second terminal device.

It is to be understood that the UDM+HSS network element determines, according to the identifier of the first terminal device and the first information, the unique access domain used by the first terminal device for establishment of the call connection between the first terminal device and the second terminal device.

For example, the first terminal device has registered with both the LTE network and the NR network, and the UDM+HSS network element determines the first terminal device according to the identifier of the first terminal device.

Optionally, the method 200 further includes the following operation.

The network device sends the access domain to a core network device serving the second terminal device such that the core network device determines an AMF network element or MME network element serving the first terminal device according to the access domain.

Accordingly, in the method for wireless communication of the embodiments of the disclosure, the network device acquires the first information being indicative of the information used for the first terminal device to establish at least one of the PDU session or the PDN connection in at least one of the first network or the second network, and the first information is related to the access domain for the first terminal device. Therefore, responsive to that the first terminal device is called by the second terminal device, the access domain used by the first terminal device for establishment of the call connection between the first terminal device and the second terminal device may be determined according to the identifier of the first terminal device and the first information, and the second terminal device may further determine a core network device serving the first terminal device based on the access domain to ensure establishment of a call.

FIG. 3 is a schematic flowchart of a method 300 for wireless communication according to an embodiment of the disclosure. As illustrated in FIG. 3, the method 300 may be performed by a network device. The network device may be a core network device in a wireless communication system 100 illustrated in FIG. 1. First terminal device has registered with both a first network and a second network. The method 300 includes the following contents.

In S310, the network device acquires first information for the first terminal device, here, the first information is indicative of information used for the first terminal device to establish at least one of a PDU session or a PDN connection in at least one of the first network or the second network.

Optionally, the first information includes at least one of: an IP address, which is allocated for the first terminal device in a PDU session establishment process, for the PDU session, an IP address, which is allocated for the first terminal device in a PDN connection establishment process, for the PDN connection, a DNN corresponding to the PDU session, or an APN corresponding to the PDN connection.

Specifically, the network device may acquire access domain information for the first terminal device in the following manners.

A first manner: the network device is an SMF network element. For example, in a PDU session establishment process, the SMF acquires the first information.

A second manner: the network device is a PGW-C network element. For example, in a PDN connection establishment process, the PGW-C network element acquires the first information.

A third manner: the network device is an AMF network element. For example, in a PDU session establishment process, the AMF network element acquires the first information sent by an SMF network element.

A fourth manner: the network device is an MME network element. For example, in a PDN connection establishment process, the MME network element acquires the first information sent by a PGW-C network element.

A fifth manner: the network device is an AMF network element. For example, responsive to that a UDM+HSS network element performs a called query for the first terminal device, the AMF network element acquires the first information sent by an SMF network element.

A sixth manner: the network device is an MME network element. For example, responsive to that a UDM+HSS network element performs a called query for the first terminal device, the MME network element acquires the first information sent by a PGW-C network element.

A seventh manner: the network device is an AMF network element. For example, the AMF network element receives first indication information sent by a UDM+HSS network element, here, the first indication information is used to indicate a query by the AMF network element for the first information.

The AMF network element sends second indication information to at least one SMF network element serving the first terminal device, here, the second indication information is used to indicate a query by the at least one SMF network element for the first information.

The AMF network element receives the first information fed back by the at least one SMF network element.

An eighth manner: the network device is an MME network element. For example, the MME network element receives third indication information sent by a UDM+HSS network element, here, the third indication information is used to indicate a query by the MME network element for the first information.

The MME network element sends fourth indication information to at least one PGW-C network element serving the first terminal device, here, the fourth indication information is used to indicate a query by the at least one PGW-C network element for the first information.

The MME network element receives the first information fed back by the at least one PGW-C network element.

A ninth manner: the network device is an SMF network element or a PGW-C network element. For example, the SMF network element or the PGW-C network element receives fifth indication information sent by a UDM+HSS network element, here, the fifth indication information is used to indicate a query for the first information.

The SMF network element or the PGW-C network element acquires the first information according to the fifth indication information.

Optionally, the first network is an LTE network and the second network is an NR network, or the first network is an NR network and the second network is an LTE network, or the first network is an NR network and the second network is an NR network, or the first network is an LTE network and the second network is an LTE network.

In S320, the network device sends the first information to a UDM+HSS network element such that the UDM+HSS network element determines, according to an identifier of the first terminal device and the first information, an access domain used by the first terminal device for establishment of a call connection between the first terminal device and a second terminal device.

It is to be understood that the steps in the method for wireless communication 300 may refer to the corresponding steps in the method for wireless communication 200 and, for simplicity, will not be elaborated herein.

Accordingly, in the method for wireless communication of the embodiments of the disclosure, the network device acquires the first information being indicative of the information used for the first terminal device to establish at least one of the PDU session or the PDN connection in at least one of the first network or the second network, and sends the first information to the UDM+HSS network element, and the first information is related to the access domain for the first terminal device. Therefore, when the first terminal device is called by the second terminal device, the UDM+HSS network element may determine, according to the identifier of the first terminal device and the first information, the access domain used by the first terminal device for establishment of the call connection between the first terminal device and the second terminal device, and the second terminal device may further determine a core network device serving the first terminal device based on the access domain to ensure establishment of a call.

Figure 4:
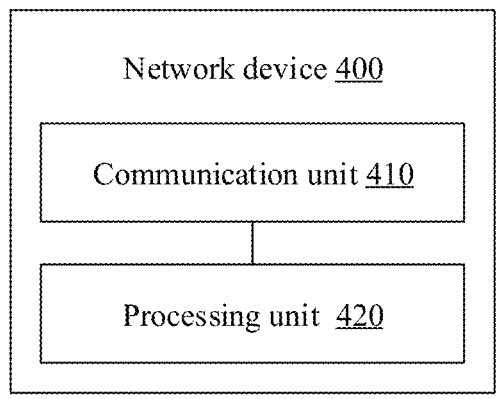
FIG. 4 is a schematic block diagram of a network device according to an embodiment of the disclosure.

FIG. 4 is a schematic block diagram of a network device 400 according to an embodiment of the disclosure. A first terminal device has registered with both a first network and a second network. The network device 400 includes a communication unit 410 and a processing unit 420.

The communication unit 410 is configured to acquire first information for the first terminal device, here, the first information is indicative of information used for the first terminal device to establish at least one of a PDU session or a PDN connection in at least one of the first network or the second network.

The processing unit 420 is configured to, responsive to that the first terminal device is called by a second terminal device, determine an access domain used by the first terminal device for establishment of a call connection between the first terminal device and the second terminal device, according to an identifier of the first terminal device and the first information.

Optionally, the first information includes at least one of: an IP address, which is allocated for the first terminal device in a PDU session establishment process, for the PDU session, an IP address, which is allocated for the first terminal device in a PDN connection establishment process, for the PDN connection, a DNN corresponding to the PDU session, or an APN corresponding to the PDN connection.

Optionally, the network device 400 is a UDM+HSS network element, and the communication unit 410 is configured to:

in a PDU session establishment process, receive the first information sent by an SMF network element serving the first terminal device, or in a PDN connection establishment process, receive the first information sent by a PGW-C network element serving the first terminal device.

Optionally, the network device 400 is a UDM+HSS network element, and the communication unit 410 is configured to:

in a PDU session establishment process, receive the first information sent by an AMF network element serving the first terminal device, here, the first information sent by the AMF network element is acquired from an SMF network element, or in a PDN connection establishment process, receive the first information sent by an MME network element serving the first terminal device, here, the first information sent by the MME network element is acquired from a PGW-C network element.

Optionally, the network device 400 is a UDM+HSS network element, and responsive to that the UDM+HSS network element performs a called query for the first terminal device, the communication unit 410 is configured to:

in a PDU session establishment process, receive the first information sent by an AMF network element serving the first terminal device, here, the first information sent by the AMF network element is acquired from an SMF network element, or in a PDN connection establishment process, receive the first information sent by an MME network element serving the first terminal device, here, the first information sent by the MME network element is acquired from a PGW-C network element.

Optionally, the network device 400 is a UDM+HSS network element, and the communication unit 410 is configured to:

receive a request message sent by the second terminal device, here, the request message is used to request the UDM+HSS network element to determine the access domain;

send query information to an AMF network element or MME network element serving the first terminal device, here, the query information is used to indicate a query for the first information; and receive the first information sent by the AMF network element or the MME network element, here, the first information sent by the AMF network element is acquired from at least one SMF network element serving the first terminal device and the first information sent by the MME network element is acquired from at least one PGW-C network element serving the first terminal device.

Optionally, the communication unit 410 is further configured to send the access domain to a core network device serving the second terminal device such that the core network device determines an AMF network element or MME network element serving the first terminal device according to the access domain.

Optionally, the first network is an LTE network and the second network is an NR network, or the first network is an NR network and the second network is an LTE network, or the first network is an NR network and the second network is an NR network, or the first network is an LTE network and the second network is an LTE network.

It is to be understood that the abovementioned and other operations and/or functions of each module in the network device 400 according to the embodiment of the disclosure are adopted to implement the corresponding flows executed by the network device in the method 200 in FIG. 2 respectively and, for simplicity, will not be elaborated herein.

Figure 5:
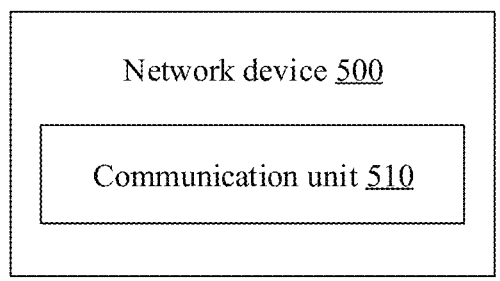
FIG. 5 is a schematic block diagram of another network device according to an embodiment of the disclosure.

FIG. 5 is a schematic block diagram of a network device 500 according to an embodiment of the disclosure. A first terminal device has registered with both a first network and a second network. The network device 500 includes a communication unit 510.

The communication unit 510 is configured to acquire first information for the first terminal device, here, the first information is indicative of information used for the first terminal device to establish at least one of a PDU session or a PDN connection in at least one of the first network or the second network.

The communication unit 510 is further configured to send the first information to a UDM+HSS network element such that the UDM+HSS network element determines, according to an identifier of the first terminal device and the first information, an access domain used by the first terminal device for establishment of a call connection between the first terminal device and a second terminal device.

Optionally, the first information includes at least one of: an IP address, which is allocated for the first terminal device in a PDU session establishment process, for the PDU session, an IP address, which is allocated for the first terminal device in a PDN connection establishment process, for the PDN connection, a DNN corresponding to the PDU session, or an APN corresponding to the PDN connection.

Optionally, the network device 500 is an SMF network element, and the communication unit 510 is configured to: in a PDU session establishment process, acquire the first information.

Optionally, the network device 500 is a PGW-C network element, and the communication unit 510 is configured to: in a PDN connection establishment process, acquire the first information.

Optionally, the network device 500 is an AMF network element, and the communication unit 510 is configured to: in a PDU session establishment process, receive the first information sent by an SMF network element.

Optionally, the network device 500 is an MME network element, and the communication unit 510 is specifically configured to: in a PDN connection establishment process, receive the first information sent by a PGW-C network element.

Optionally, the network device 500 is an AMF network element, and responsive to that the UDM+HSS network element performs a called query for the first terminal device, the communication unit 510 is configured to receive the first information sent by an SMF network element.

Optionally, the network device 500 is an MME network element, and responsive to that the UDM+HSS network element performs a called query for the first terminal device, the communication unit 510 is specifically configured to receive the first information sent by a PGW-C network element.

Optionally, the network device 500 is an AMF network element, and the communication unit 510 is configured to:
  receive first indication information sent by the UDM+HSS network element, here, the first indication information is used to indicate that the AMF network element queries the first information;
  send second indication information to at least one SMF network element serving the first terminal device, here, the second indication information is used to indicate the at least one SMF network element queries the first information; and
  receive the first information fed back by the at least one SMF network element.

Optionally, the network device 500 is an MME network element, and the communication unit 510 is configured to:
  receive third indication information sent by the UDM+HSS network element, here, the third indication information is used to indicate that the MME network queries the first information;
  send fourth indication information to at least one PGW-C network element serving the first terminal device, here, the fourth indication information is used to indicate that the at least one PGW-C network element queries the first information; and
  receive the first information fed back by the at least one PGW-C network element.

Optionally, the network device 500 is an SMF network element or a PGW-C network element, and the communication unit 510 is configured to:
  receive fifth indication information sent by the UDM+HSS network element, here, the fifth indication information is used to indicate a query for the first information; and
  acquire the first information according to the fifth indication information.

Optionally, the first network is an LTE network and the second network is an NR network, or the first network is an NR network and the second network is an LTE network, or the first network is an NR network and the second network is an NR network, or the first network is an LTE network and the second network is an LTE network.

It is to be understood that the abovementioned and other operations and/or functions of each module in the network device 500 according to the embodiment of the disclosure are adopted to implement the corresponding flows executed by the network device in the method 300 in FIG. 3 respectively and, for simplicity, will not be elaborated herein.

Figure 6:
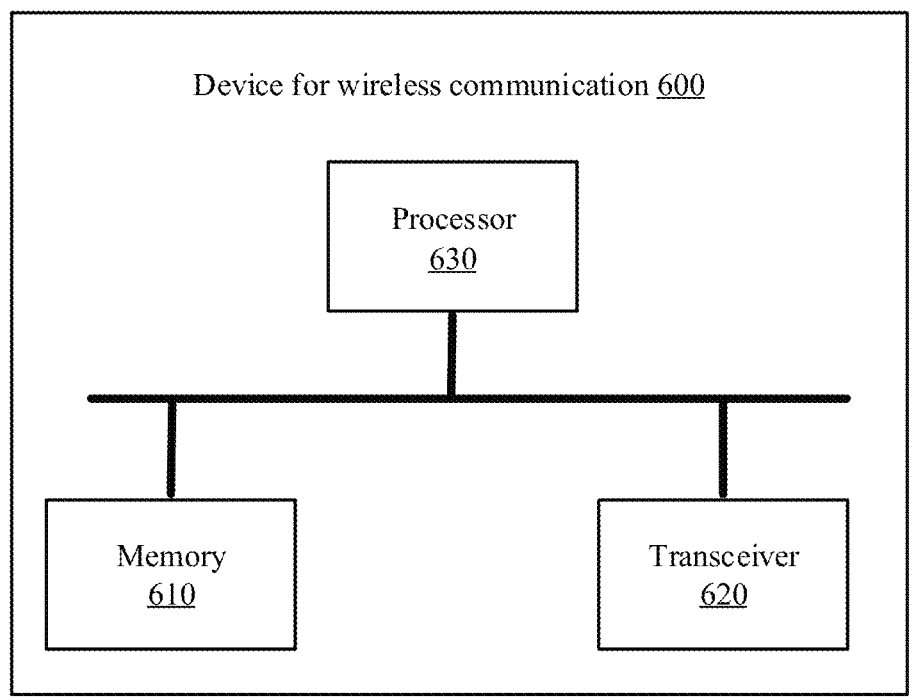
FIG. 6 is a schematic block diagram of a device for wireless communication according to an embodiment of the disclosure.

FIG. 6 is a schematic block diagram of a device 600 for wireless communication according to an embodiment of the disclosure. The device 600 includes a memory 610, a transceiver 620 and a processor 630.

The memory 610 is configured to store a program including a code.

The transceiver 620 is configured to communicate with another device.

The processor 630 is configured to execute the program code in the memory 610.

Optionally, the transceiver 620 is configured to execute specific signal transmission and reception under driving of the processor 630.

Optionally, when the code is executed, the processor 630 may implement each operation executed by a network device in the method 200 in FIG. 2. For simplicity, no more elaborations will be made herein. In such case, the device 600 may be a UDM+HSS network element.

Optionally, when the code is executed, the processor 630 may implement each operation executed by a network device in the method 300 in FIG. 3. For simplicity, no more elaborations will be made herein. In such case, the device 600 may be a core network device (for example, an AMF).

It is to be understood that in the embodiment of the disclosure, the processor 630 may be a Central Processing Unit (CPU) and the processor 630 may also be another universal processor, a Digital Signal Processor (DSP), an Application Specific Integrated Circuit (ASIC), a Field-Programmable Gate Array (FPGA) or another programmable logic device, discrete gate or transistor logic device, and discrete hardware component and the like. The universal processor may be a microprocessor or the processor may also be any conventional processor and the like.

The memory 610 may include a Read Only Memory (ROM) and a Random Access Memory (RAM) and provides an instruction and data for the processor 630. A part of the memory 610 may further include a nonvolatile RAM. For example, the memory 610 may further store information of a device type.

The transceiver 620 may be configured to realize signal sending and receiving functions, for example, frequency modulation and demodulation functions or up-conversion and down-conversion functions.

In an implementation process, at least one operation of the method may be completed through an integrated logical circuit of hardware in the processor 630, or the integrated logical circuit may complete the at least one operation under driving of an instruction in a software form. Therefore, the device 600 for wireless communication may be a chip or a chip set. The operations of the method disclosed in combination with the embodiments of the disclosure may be directly embodied to be executed and completed by a hardware processor or executed and completed by a combination of hardware and software modules in the processor. The software module may be located in a mature storage medium in the art such as a random access memory, a flash memory, a read-only memory, a programmable read-only memory or electrically erasable programmable read-only memory and a register. The storage medium is located in the memory, and the processor 630 reads information in the memory and completes the operations of the methods in combination with hardware. No more detailed descriptions will be made herein to avoid repetitions.

Figure 7:
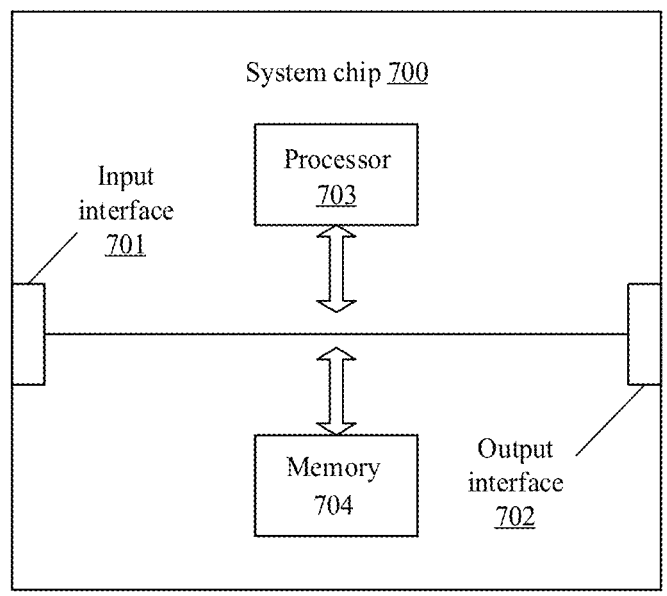
FIG. 7 is a schematic structure diagram of a system chip according to an embodiment of the disclosure.

FIG. 7 is a schematic structure diagram of a system chip 700 according to an embodiment of the disclosure. The system chip 700 of FIG. 7 includes an input interface 701, output interface 702, processor 703 and memory 704 which may be connected through an internal communication connecting line. The processor 703 is configured to execute a code in the memory 704.

Optionally, when the code is executed, the processor 703 implements a method executed by a network device in the embodiment of the method 200. For simplicity, no more elaborations will be made herein.

Optionally, when the code is executed, the processor 703 implements a method executed by a network device in the embodiment of the method 300. For simplicity, no more elaborations will be made herein.

The embodiments may be implemented completely or partially through software, hardware, firmware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction(s) may be stored in a computer-readable storage medium or be transmitted from one computer-readable storage medium to another computer-readable storage medium. For example, the computer instruction(s) may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a DVD), a semiconductor medium (for example, a Solid State Disk (SSD)) or the like.

It is to be understood that in various embodiments of the disclosure, a magnitude of a sequence number of each process does not mean an execution sequence and the execution sequence of each process should be determined by its function and an internal logic and should not form any limit to an implementation process of the embodiments of the disclosure.

Those skilled in the art may clearly learn about that specific working processes of the system, device and unit described above may refer to the corresponding processes in the method embodiments and will not be elaborated herein for convenient and brief description.

The above are only the specific implementation modes of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for wireless communication, comprising:
   acquiring, by a network device, first information for a first terminal device, wherein the first terminal device has registered with both a first network and a second network, and the first information is indicative of information used for the first terminal device to establish at least one of a Packet Data Unit (PDU) session or a Packet Data Network (PDN) connection in at least one of the first network or the second network; and
   responsive to that the first terminal device is called by a second terminal device, determining, by the network device according to an identifier of the first terminal device and the first information, an access domain used by the first terminal device for establishment of a call connection between the first terminal device and the second terminal device,
   sending, by the network device, the access domain to a core network device serving the second terminal device such that the core network device determines an Access and Mobility Function (AMF) network element or Mobility Management Entity (MME) network element serving the first terminal device according to the access domain,
   wherein the network device is a Unified Data Management (UDM) and Home Subscriber Server (HSS) (UDM+HSS) network element, and
   acquiring, by the network device, the first information for the first terminal device comprises:
   receiving, by the UDM+HSS network element, a request message sent by the second terminal device, the request message being used to request the UDM+HSS network element to determine the access domain;
   sending, by the UDM+HSS network element, query information to an Access and Mobility Function (AMF) network element or Mobility Management Entity (MME) network element serving the first terminal device, the query information being used to indicate a query for the first information; and
   receiving, by the UDM+HSS network element, the first information sent by the AMF network element or the MME network element, the first information sent by the AMF network element being acquired from the at least one Session Management Function (SMF) network element serving the first terminal device and the first information sent by the MME network element being acquired from the at least one Core Packet Gateway (PGW-C) network element serving the first terminal device.

2. The method of claim 1, wherein the first information comprises at least one of: an Internet Protocol (IP) address, which is allocated for the first terminal device in a PDU session establishment process, for the PDU session, an IP address, which is allocated for the first terminal device in a PDN connection establishment process, for the PDN connection, a Destination Network Name (DNN) corresponding to the PDU session, or an Access Point Name (APN) corresponding to the PDN connection.

3. A network device, comprising:
   a transceiver configured to acquire first information for a first terminal device, wherein a first terminal device is registered with both a first network and a second network, and the first information is indicative of information used for the first terminal device to establish at least one of a Packet Data Unit (PDU) session or a Packet Data Network (PDN) connection in at least one of the first network or the second network; and a processor configured to, responsive to that the first terminal device is called by a second terminal device, determine an access domain used by the first terminal device for establishment of a call connection between the first terminal device and the second terminal device, according to an identifier of the first terminal device and the first information, wherein the transceiver is further configured to send the access domain to a core network device serving the second terminal device such that the core network device determines an Access and Mobility Function (AMF) network element or Mobility Management Entity (MME) network element serving the first terminal device according to the access domain;

wherein the network device is a Unified Data Management (UDM) and Home Subscriber Server (HSS) (UDM+HSS) network element, and the transceiver is configured to:

receive a request message sent by the second terminal device, the request message being used to request the UDM+HSS network element to determine the access domain;

send query information to an Access and Mobility Function (AMF) network element or Mobility Management Entity (MME) network element serving the first terminal device, the query information being used to indicate a query for the first information; and receive the first information sent by the AMF network element or the MME network element, the first information sent by the AMF network element being acquired from the at least one Session Management Function (SMF) network element serving the first terminal device and the first information sent by the MME network element being acquired from the at least one Core Packet Gateway (PGW-C) network element serving the first terminal device.

4. The network device of claim 3, wherein the first information comprises at least one of: an Internet Protocol (IP) address, which is allocated for the first terminal device in a PDU session establishment process, for the PDU session, an IP address, which is allocated for the first terminal device in a PDN connection establishment process, for the PDN connection, a Destination Network Name (DNN) corresponding to the PDU session, or an Access Point Name (APN) corresponding to the PDN connection.

5. A network device, comprising:

a transceiver configured to acquire first information for a first terminal device, wherein the first terminal device is registered with both a first network and a second network, and the first information is indicative of information used for the first terminal device to establish at least one of a Packet Data Unit (PDU) session or a Packet Data Network (PDN) connection in at least one of the first network or the second network; and the transceiver is further configured to send the first information to a Unified Data Management (UDM) and Home Subscriber Server (HSS) (UDM+HSS) network element such that the UDM+HSS network element determines, according to an identifier of the first terminal device and the first information, an access domain used by the first terminal device for establishment of a call connection between the first terminal device and a second terminal device, wherein the access domain is used for determining an Access and Mobility Function (AMF) network element or Mobility Management Entity (MME) network element serving the first terminal device, and wherein the network device is an Access and Mobility Function (AMF) network element, and the transceiver is configured to:

receive first indication information sent by the UDM+HSS network element, the first indication information being used to indicate that the AMF network element queries the first information;

send second indication information to at least one Session Management Function (SMF) network element serving the first terminal device, the second indication information being used to indicate that the at least one SMF network element queries the first information; and receive the first information fed back by the at least one SMF network element.

6. The network device of claim 5, wherein the first information comprises at least one of: an Internet Protocol (IP) address, which is allocated for the first terminal device in a PDU session establishment process, for the PDU session, an IP address, which is allocated for the first terminal device in a PDN connection establishment process, for the PDN connection, a Destination Network Name (DNN) corresponding to the PDU session, or an Access Point Name (APN) corresponding to the PDN connection.

7. The network device of claim 5, wherein the network device is a Mobility Management Entity (MME) network element, and the transceiver is configured to:

receive third indication information sent by the UDM+HSS network element, the third indication information being used to indicate that the MME network element queries the first information;

send fourth indication information to at least one Core Packet Gateway (PGW-C) network element serving the first terminal device, the fourth indication information being used to indicate that the at least one Core Packet Gateway (PGW-C) network element queries the first information; and receive the first information fed back by the at least one PGW-C network element.

8. The network device of claim 5, wherein the network device is a Session Management Function (SMF) network element or a Core Packet Gateway (PGW-C) network element, and the transceiver is configured to:

receive fifth indication information sent by the UDM+HSS network element, the fifth indication information being used to indicate a query for the first information; and acquire the first information according to the fifth indication information.

\* \* \* \* \*